United States Patent [19]

Himpsl et al.

[11] Patent Number: 5,106,485
[45] Date of Patent: Apr. 21, 1992

[54] CATALYTIC CRACKING OF HYDROCARBONS WITH A MIXTURE OF ZEOLITE L AND ZEOLITE Y

[75] Inventors: Francis L. Himpsl, Matawan; Gerald S. Koermer, Roseland, both of N.J.

[73] Assignee: Engelhard Corporation, Iselin, N.J.

[21] Appl. No.: 587,288

[22] Filed: Sep. 21, 1990

Related U.S. Application Data

[63] Continuation-in-part of Ser. No. 534,816, Jun. 7, 1990, which is a continuation of Ser. No. 428,468, Oct. 27, 1989, abandoned, which is a continuation of Ser. No. 216,682, Jul. 7, 1988, abandoned.

[51] Int. Cl.$^5$ .............................................. C10G 11/18
[52] U.S. Cl. ........................................ 208/120; 502/67
[58] Field of Search ............................ 208/120; 502/67

[56] References Cited

U.S. PATENT DOCUMENTS

| | | | |
|---|---|---|---|
| 1,597,208 | 8/1926 | Naugle | 373/115 |
| 1,601,222 | 9/1926 | Naugle | 373/116 |
| 1,634,477 | 7/1927 | Wickenden et al. | 502/5 |
| 1,701,272 | 2/1929 | Naugle | 502/413 |
| 2,003,278 | 5/1935 | Olson | 502/5 |
| 2,270,245 | 1/1942 | Barker | 373/113 |
| 3,216,789 | 11/1965 | Breck et al. | 502/64 |
| 3,758,403 | 9/1973 | Rosinski et al. | 208/120 |
| 3,804,747 | 4/1974 | Kimberlin et al. | 208/120 |
| 3,915,842 | 10/1975 | Gatsis | 208/112 |
| 4,137,152 | 1/1979 | Chester et al. | 208/120 |
| 4,139,489 | 2/1979 | Mizuno et al. | 502/5 |
| 4,164,465 | 8/1979 | Gladrow | 208/120 |
| 4,261,857 | 4/1981 | Nakao | 502/5 |
| 4,357,210 | 11/1982 | Aubry et al. | 201/27 |
| 4,588,496 | 5/1986 | Scherzer | 208/120 |
| 4,593,133 | 6/1986 | Wortel | 585/915 |
| 4,632,749 | 12/1986 | Hilfman | 208/120 |
| 4,743,355 | 5/1988 | Ward | 208/59 |
| 4,781,816 | 11/1988 | Lee et al. | 208/120 |

FOREIGN PATENT DOCUMENTS

| | | | |
|---|---|---|---|
| 353 | 2/1962 | Japan | 201/27 |
| 12425 | 5/1968 | Japan | 502/5 |
| 1294 | 1/1979 | Japan | 502/5 |

*Primary Examiner*—Anthony McFarlane

[57] ABSTRACT

Hydrocarbons, particularly gas oil, are cracked to products boiling in the motor fuel range by using a catalyst mixture comprising zeolite Y and zeolite L. The catalyst of this invention results in obtaining a fuel having an increased octane number and suffering a smaller penalty with regard to yield relative to other octane additive systems.

4 Claims, 1 Drawing Sheet

CATALYTIC CRACKING OF HYDROCARBONS WITH A MIXTURE OF ZEOLITE L AND ZEOLITE Y

CROSS REFERENCE TO RELATED APPLICATION

This application is a continuation-in-part of Ser. No. 534,816, filed June 7, 1990, which is a continuation of Ser. No. 428,468, filed Oct. 27, 1989, now abandoned, which is a continuation of Ser. No. 216,682, filed July 7, 1988, now abandoned.

BACKGROUND OF THE INVENTION

1. Field of the Invention

The present invention relates to hydrocarbon cracking catalysts and uses thereof in catalytic cracking in order to obtain gasoline having an enhanced octane value. An additional benefit of the novel process of this invention resides in the fact that the octane boost which is obtained is at the expense of a smaller loss of gasoline product than has heretofore been possible.

2. Description of the Prior Art

Hydrocarbon conversion processes utilizing crystalline aluminosilicates have been the subject of extensive investigation during recent years as is obvious from both the patent and scientific literature. Crystalline aluminosilicates have been found to be particularly effective for a wide variety of hydrocarbon conversion processes, including the catalytic cracking of a gas oil to produce motor fuels and have been described and claimed in many patents.

Hydrocarbon cracking catalysts comprising a zeolite dispersed in a matrix are known; see, for example, U.S. Pat. Nos. 3,140,249, 3,352,796, 3,647,718, 4,581,340, 4,581,341 and 4,493,902.

It is also known in the art to use a mixture of zeolites for various hydrocarbon conversions. Thus, for example, U.S. Pat. No. 4,137,152 discloses a cracking process utilizing a mixture of faujasite and mordenite.

U.S. Pat. No. 3,894,934 discloses catalytic cracking of hydrocarbons using a large-pore zeolite and ZSM-5.

U.S. Pat. No. 3,871,993 discloses a process for upgrading the octane value of a naphtha using shape-selective catalysts such as ZSM-5, ZSM-11, ZSM-12, ZSM-21, mordenite, etc.

U.S. Pat. No. 3,702,886 discloses the use of ZSM-5 zeolites alone or in combination with other materials such as zeolites or inert materials for catalytic cracking of hydrocarbons.

U.S. Pat. No. 3,804,747 discloses a hydrocarbon conversion process utilizing a mixture of zeolites X and Y.

U.S. Pat. No. 3,758,403 discloses catalytic cracking comprising a large-pore zeolite such as zeolite Y and a small-pore zeolite such as ZSM-5 in a siliceous matrix. The matrix may be active or inactive such as silica-alumina or alumina. The use of a ZSM-5 type zeolite results in obtaining a fuel of increased octane number.

U.S. Pat. No. 3,769,202 discloses a combination catalyst comprising a mixture of two different zeolites, one having a pore size greater than 8 Angstrom units and the other having a pore size of less than 7 Angstrom units. The zeolites are mixed with an inorganic oxide matrix such as silica-alumina. The catalyst is stated to be suitable for cracking and hydrocracking of hydrocarbons.

U.S. Pat. No. 3,925,195 discloses a cracking process utilizing a catalyst comprising a mixture of rare earth hydrogen Y-type zeolites and hydrogen or transition metal exchange mordenite, calcium exchanged type A zeolite or hydrogen exchanged erionite in an amorphous matrix.

U.S. Pat. No. 3,764,520 discloses a catalyst comprising a mixture of two different zeolites, one having a pore size within the range of 6 to 15 Angstrom units and the other having a pore size of less than 6 Angstrom units in combination with an inorganic oxide support.

U.S. Pat. No. 4,287,048 discloses an ultra-stable Y type crystalline aluminosilicate in admixture with a small-pore crystalline aluminosilicate zeolite selected from the group consisting of erionite, mordenite, zeolite A, chabazite, offretite and a catalytic inorganic oxide matrix.

U.S. Pat. No. 4,309,280 discloses a process for increasing the gasoline octane number and/or a total gasoline yield in catalytic cracking by adding a crystalline aluminosilicate zeolite having a silica-to-alumina mole ratio greater than about 12 and a constraint index within the approximate range of 1:12 to a cracking unit which contains a zeolite cracking catalyst such as zeolite Y.

European Patent 243629 discloses a cracking catalyst for producing high octane gasoline comprising zeolite Beta or ZSM-20 which may also contain up to 30 wt. % of a secondary zeolite which can be zeolite X, zeolite Y, ferrierite, mordenite and mixtures thereof. These catalysts contain a matrix and the ratio of the primary zeolite to the secondary zeolite is at least 1:1.

Perrotta et al in the *Journal of Catalysis*, Vol. 55, pages 240–249 (1978) discloses catalytic cracking of a gas oil with an omega-faujasite system wherein the catalyst is prepared by a co-crystallization technique.

The catalytic properties of zeolite L have been studied, i.e., see Parra et al, *Journal of Catalysis*, Vol. 40, pages 52–60 (1975), A. W. Peters et al, in an abstract entitled *Octane Catalyst Design Strategies in Catalytic Cracking*, said abstract having been published in connection with the 10th North American Meeting of the Catalysis Society held in San Diego on May 17–22, 1987.

The simple fact remains that there has been no recognition of utilizing a mixture of zeolite L and Y in the catalytic cracking of gas oil in order to produce gasoline having an enhanced octane value at a minimum loss of gasoline yield.

DESCRIPTION OF THE DRAWING

The FIGURE is a plot of coke selectivity vs zeolite L content.

DESCRIPTION OF THE INVENTION

Figure 1:
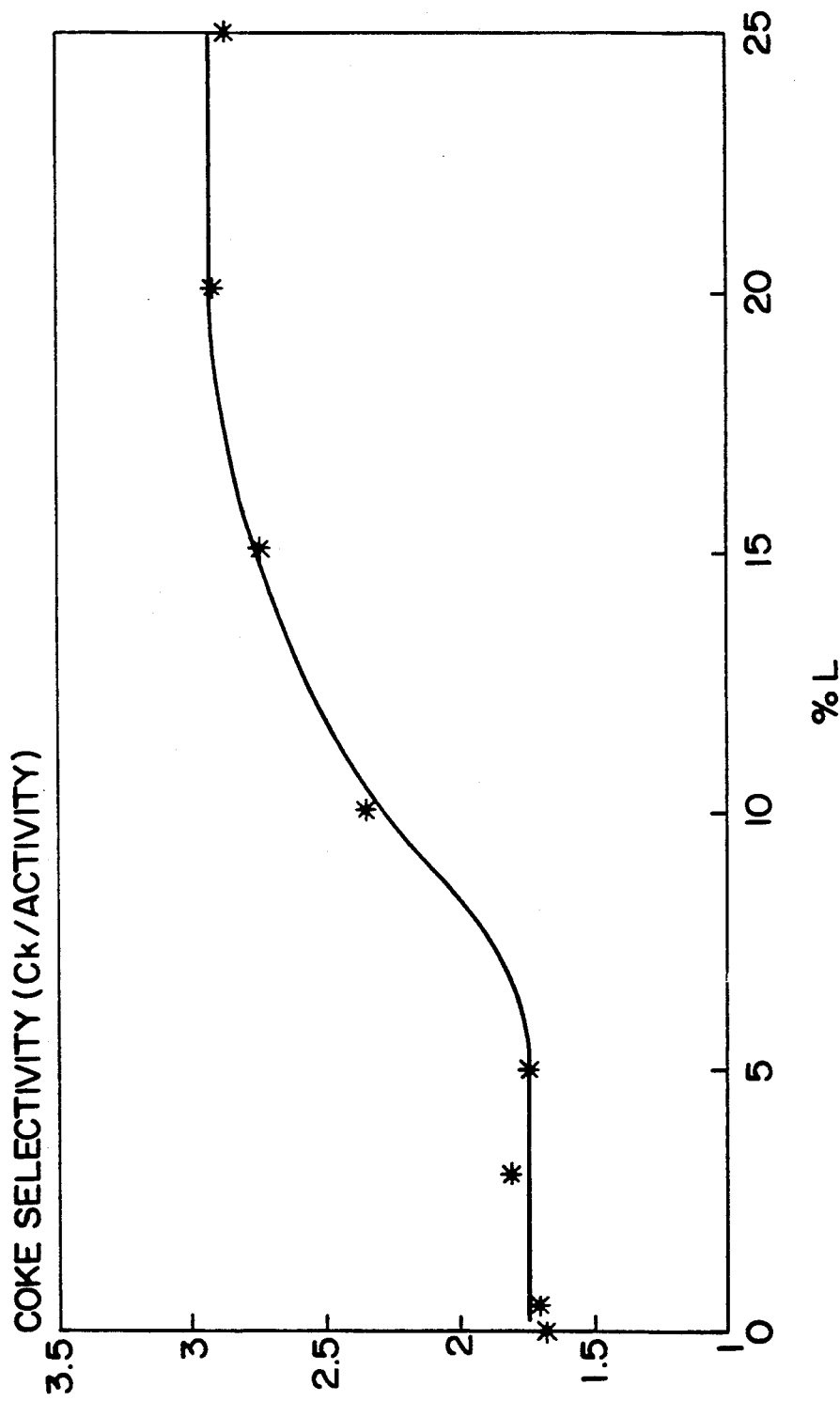

It has now been discovered that improved results can be obtained in the catalytic cracking of gas oil with respect to both octane number and overall yield if the gas oil is cracked utilizing a catalyst composition comprising a mixture of zeolite Y and zeolite L.

Both zeolite Y and zeolite L are well known in the art and have been described in numerous technical publications including patents.

Zeolite L is disclosed and claimed in U.S. Pat. No. 3,216,789, the entire disclosure of which is herein incorporated by reference.

Improvements have been made in processes for the manufacture of zeolite L as well as processes involving particular morphologies of zeolite L. Such processes are summarized in U.S. Pat. No. 4,593,133, the entire disclosure of which is herein incorporated by reference.

Zeolite Y is broadly intended to include both the "normal" zeolite Y as well as zeolite Y which has been stabilized by heat treatment, sometimes referred to as ultra-stable Y type zeolites, which are well in known in the art and are described, for example, in U.S. Pat. No. 3,293,192, U.S. Pat. No. 3,402,996 and the publication *Society of Chemical Engineering* (London) Monograph Molecular Sieves, page 186 (1968) by C. V. McDaniel and P. K. Maher, the teachings of which are herein incorporated by reference. Zeolite Y is also intended to include metal ion-exchanged forms, such as rare earth or other metal exchanged forms, as well as zeolite Y exchanged with ammonium ions and rare earth or other metal ions.

As is known, when crystalline aluminosilicate zeolites are employed in commercial cracking operations, such as FCC (fluid catalytic cracking) utilizing very finely-divided particles and TCC (thermofor catalytic cracking) using a moving bed type of reactor, it is necessary that the zeolite be in some way associated with a matrix in order to provide the necessary physical characteristics.

The matrices employed in the novel process of this invention are conventional to the catalytic cracking art and include materials which are catalytically active or inactive and are generally inorganic oxides, especially those such as alumina or silica. Catalytically active inorganic oxides such as clay, chemically treated clay, silica, silica-alumina, etc., are particularly preferred because they can provide catalysts of superior porosity and attrition resistance.

In one embodiment, the novel catalyst composites of this invention comprise a physical mixture of Y and L in a common matrix. Alternatively, a mixture of Y in a matrix and a mixture of L in a matrix can be physically blended. The matrices for both zeolites need not be the same.

In still another embodiment of this invention, zeolite L can be introduced into a cracking unit which contains zeolite Y. In this embodiment of the invention, the zeolite L can be introduced into the circulating catalyst inventory in the form of a finely-divided powder or in combination with a matrix which is either catalytically active or catalytically inert. The zeolite L can be introduced into the regenerator or into contact with the hydrocarbon feedstock.

It is to be understood that zeolite L and zeolite Y can be synthesized from gel[s] and then combined with a matrix, or particles of zeolite L in a matrix or particles of both zeolite L and zeolite Y in the same matrix can be derived from clay precursor bodies by modification of known in situ procedures (such as those described in U.S. Pat. No. 3,647,718 and U.S. Pat. No. 4,493,902) so that they would inherently have a silica-alumina matrix as a result of the synthesis process.

As is well known in the art, the sodium content of zeolite Y must be reduced in order to impart desirable catalytic activity. The original cations associated with zeolite L can be replaced with other cations according to techniques well known in the art. Typical replacing cations for zeolites Y and L would include hydrogen, ammonium and metal cations, including mixtures of the same. Typical replacing metal ions would include rare earth, magnesium, zinc, manganese, aluminum and calcium.

A typical ion exchange technique would be to contact the particular zeolite or mixtures of zeolites with a salt of the desired replacing cation or cations. Although a wide variety of salts can be employed, particular preference is given to chlorides, nitrates and sulfates. Methods representative of ion exchange techniques are disclosed in a wide variety of patents including U.S. Pat. Nos. 3,140,249, 3,140,251 and 3,140,253.

In order to increase zeolite hydrothermal stability, it is often desirable to raise the silica to alumina molar ratio of the framework structure. This may be done in a number of ways, the most common of which include calcination in the presence of steam (sometimes referred to as "ultrastabilization", and chemical dealumination with reagents such as ammonium hexafluorosilicate $(NH_4)_2 SiF_6$ as in U.S. Pat. No. 4,610,856. It is well known in the art that high $SiO_2/Al_2O_3$ or ultrastable zeolites have increased stability regardless of the particular method of preparation. We have found that the hydrothermal stability of zeolite L may be improved significantly by calcination in the presence of steam. Calcination is generally done following ion exchange procedures. Typical calcination temperatures range from 500° F. to 1500° F. (preferably 1000° F. to 1500° F.) for periods of time ranging from 1 to 48 hours or more. The treatment may be accomplished in atmospheres consisting partially or entirely of steam. This treatment could feasibly be accomplished within a commercial cracking unit by gradual addition of the unsteamed catalyst to the unit, for example.

It has been found that in order to obtain the beneficial properties with regard to cracking of gas oil, the amount of zeolite L which is added is critical. Moreover, during the process of hydrothermal stabilization (calcination in the presence of steam) one generally observes a reduction in total zeolite L crystallinity as measured by x-ray diffraction. Thus, the effective amount of zeolite L must account for the degree of stabilization desired for the specific cracking application. Depending on the mode of addition of zeolite L to the catalytic cracking unit (i.e., addition with the fluid cracking catalyst component or addition to the hydrocarbon feed), we speculate that the degree of stabilization needed, and hence the required additive amount of zeolite L, may be considerably different. In general, we find that ratios of "pure" zeolite L to "pure" zeolite Y should range from 0.02 to 0.8. The expression "pure" in the above statement is intended to define the zeolite without matrix. When considering the matrix, the zeolite Y should typically constitute from 5 to 70% of the total catalyst composition, and zeolite L should constitute from 0.1 to 60% to the total catalyst composition, more preferably 1.0 to 10%. We feel that these levels are effective in increasing gasoline RON via the process of this invention, but should not be considered limiting to the present scope.

The following examples will illustrate the best mode now contemplated for carrying out the novel process of this invention.

EXAMPLE 1

This example will illustrate one method of preparing the catalyst composition of this invention.

A sample of microspheres containing zeolites L and Y may be prepared by spray drying the two zeolites, which are commercially available from the Linde Division of Union Carbide Corporation along with kaolin (ASP-600) and sodium silicate as binder. A typical overall solids composition is 5% potassium form zeolite L, 20% sodium form zeolite Y, 20% sodium silicate and 55% kaolin. Following spray drying, the catalyst sample can then be exhaustively ammonium ion exchanged using a 2 molar solution of ammonium nitrate at a pH of 3.0 to 3.2, for example, to result in a finished catalyst containing a suitably reduced alkali metal content.

EXAMPLE 2

This example will illustrate a method of preparing the zeolite L component of catalyst composition of this invention. In this preparation zeolite L is prepared in-situ.

A solution was prepared using 28.7 grams of potassium hydroxide pellets (Fisher reagent grade, 85.8% KOH) and 329.5 grams of a potassium silicate solution (Pflatz and Bauer) containing 7.14 wt. % $K_2O$ and 20.9 wt % $SiO_2$ in 438.7 grams of water and adding the same to a one liter reaction vessel. 88.1 grams of metakaolin microspheres (prepared by spray drying ASP ® Kaolin clay and calcining to convert the kaolin to metakaolin) was then added while stirring. The temperature was raised to 210° F. and stirring was continued. The reaction mixture has a composition, expressed in terms of molar oxide ratios as follows:

$$1.18K_2O:4.90SiO_2:Al_2O_3:95.4H_2O$$

After 138 hours, the reaction product was filtered, washed and oven dried. X-ray diffraction of the microsphere product confirmed the presence of zeolite L.

EXAMPLE 3

This example will illustrate an improved in-situ preparation of zeolite L.

A solution was prepared using 120.4 grams of KOH pellets (same as Example 2) and 2,095 grams of a potassium silicate solution (PQ Corporation, containing 8.50 wt. % $K_2O$ and 24.2 wt. % $SiO_2$) in 663.5 grams of water and adding the same to a 3 liter reaction vessel. While stirring, 312.5 grams of metakaolin microspheres (described in Example 2) was added and the temperature increased to 210° F. The reaction mixture has a composition expressed in terms of molar oxide ratios as follows:

$$2.0K_2O:8SiO_2:Al_2O_3:80H_2O$$

After 139.5 hours the product was filtered, washed and dried.

The influence of zeolite L was confirmed by x-ray.

Quite obviously, the catalyst composites of this invention include a blend of the zeolite L microspheres with zeolite Y microspheres.

EXAMPLE 4

This example will illustrate another method of preparing the catalyst composition of the invention and its use in the catalytic cracking of gas oil. Microspheres composed of 30% potassium form zeolite L (KL), 20% sodium silicate ($SiO_2/Na_2O=2$) and 50% hydrous high purity kaolin clay were prepared by spray drying a slurry containing zeolite L crystals, ASP ® kaolin clay and sodium silicate solution. The microspheres were subjected to ammonium exchange with a 2M solution of ammonium nitrate until a potassium content of 0.95 $K_2O$ was obtained. Following an ion exchange, the dried L-containing microspheres were calcined in air at 1000° F. for one hour. Various amounts of additive microspheres L were blended with a steam deactivated hydrothermally stabilized zeolite Y-containing cracking catalyst (hereinafter Catalyst A) so as to result in zeolite L contents of 15%, 3%, and 0%, based on total catalyst weight. A control sample was also utilized consisting of the same Catalyst A blended 1:1 with an activity adjusting component prepared by spray drying a slurry of hydrous kaolin to form microspheres and then calcining the microspheres substantially as described in U.S. Pat. No. 4,493,902 at column 16, line 6 to 15. Each experimental sample contained 50% by weight of the Catalyst A with the balance consisting of zeolite L-containing microspheres and the activity adjusting microspheres.

A catalyst similar to Catalyst A is described in EPA 0,194,101, published Sept. 10, 1986, the entire disclosure of which is herein incorporated by reference.

A typical analysis and physical properties of Catalyst A used in this example is as follows:

| | |
|---|---|
| % $Al_2O_3$ | 42.20 |
| % $SiO_2$ | 54.90 |
| % $Na_2O$ | 0.36 |
| % $TiO_2$ | 1.59 |
| % $Fe_2O_3$ | 1.42 |
| % CaO | 0.02 |
| % MgO | 0.02 |
| % $K_2O$ | 0.03 |
| % ReO | 0.00 |
| Physical Properties: | |
| Zeolite Index = 35 | |
| Unit Cell Size = 24.65 A | |
| Total Surface Area = 385 $m^2/g$ | |
| $N_2$ Porosity (<100A) = 1.15 cc/g | |
| $N_2$ Porosity (<600A) = 0.19 cc/g | |
| Total $N_2$ Porosity = 0.33 cc/g | |

The above catalysts were evaluated by MAT testing, referenced in U.S. Pat. No. 4,493,902 at column 3, lines 30–50. Prior to carrying out the MAT tests, Catalyst A (alone) was deactivated by steam as described in U.S. Pat. No. 4,493,902 at column 4, lines 28–41. In combination with MAT testing, the catalysts were further evaluated to determine the relative research octane number (RON) of the gasoline fraction of the MAT syn crude by a test developed by W. Cronkright of M. W. Kellogg Corporation and described in a publication entitled "W. A. Cronkright and M. M. Butler, FCC Feedstock Evaluations Using the Micro Activity Test," M. W. Kellogg Company (1984). In the above test method, the syn crude gasoline fraction aromaticity and olefinicity are correlated so as to obtain a calculated research octane number.

The Cronkright method employed in the following example is a modification of an earlier procedure reported by Anderson, Sharkey and Walsh, *Journal of the Institute of Petroleum*, Vol. 58, page 83, 1982, the entire disclosure of all such methods being herein incorporated by reference.

The following Table demonstrates the selectivity effects observed from zeolite L addition to Catalyst A.

As can be seen from the following table, at a zeolite L level of 15%, gasoline yield loss was substantial accompanied by greatly increased coke and gas yields. By reducing the zeolite L level to 3%, gasoline loss was less severe, about 2.3% absolute at 70% conversion and, surprisingly, coke make was no worse than in the control sample. Please note, however, that a substantial increase in RON was observed at an additive level of 3% zeolite L thereby demonstrating its usefulness in producing gasoline having increased octane number at a minimum cost in gasoline yield. The blend containing 0.5% zeolite L had less of an effect on product selectivities and, therefore, may be too low an amount to be included within the novel process or compositions of the instant invention. However, it is likely that the effect observed on gasoline yield and RON is feedstock dependent, and as such small levels of added zeolite L could possibly improve product quality with alternate feeds.

TABLE 1

Catalytic Results from MAT Gas Oil Cracking

| STM Temp °F. | CONV Wt. % | ACTIVITY | C4-GAS | GASOLINE | LCO | BOTTOMS | COKE | DRY GAS | IC4/C4 = | RON |
|---|---|---|---|---|---|---|---|---|---|---|
| CATALYST A/ACTIVITY ADJUSTING BLEND CONTROL 50/50 ||||||||||| 
| 1,400.00 | 74.80 | 2.96 | 16.45 | 53.86 | 16.77 | 8.15 | 4.43 | 1.73 | 1.92 | 92.5 |
| 1,400.00 | 74.70 | 2.96 | 15.42 | 54.55 | 16.49 | 8.42 | 4.77 | 1.60 | 1.92 | 86.2 |
| 1,450.00 | 66.90 | 2.02 | 12.53 | 50.69 | 20.74 | 12.04 | 3.66 | 1.52 | 1.57 | 86.8 |
| 1,450.00 | 67.21 | 2.05 | 14.25 | 49.30 | 18.85 | 13.60 | 3.66 | 1.53 | 1.53 | 85.9 |
| 1,500.00 | 56.17 | 1.28 | 10.70 | 42.61 | 23.35 | 20.13 | 2.86 | 1.30 | 1.10 | 87.2 |
| 1,500.00 | 60.41 | 1.53 | 11.54 | 45.63 | 22.49 | 16.77 | 3.24 | 1.38 | 0.99 | 87.1 |
| CATALYST A/L BLEND TOTAL L BONTENNT = 15% ||||||||||| 
| 1,400.00 | 69.49 | 2.28 | 16.98 | 45.77 | 16.42 | 13.76 | 6.73 | 2.08 | 3.14 | 87.3 |
| 1,400.00 | 76.99 | 3.35 | 19.75 | 50.59 | 15.24 | 7.44 | 6.64 | 2.15 | 2.75 | 87.6 |
| 1,450.00 | 74.08 | 2.86 | 17.73 | 50.46 | 16.13 | 9.46 | 5.89 | 1.91 | 2.16 | 85.7 |
| 1,450.00 | 73.59 | 2.79 | 17.21 | 50.49 | 16.29 | 9.79 | 5.89 | 1.89 | 2.28 | 85.2 |
| 1,500.00 | 62.75 | 1.68 | 14.07 | 42.86 | 21.05 | 15.86 | 5.83 | 1.59 | 1.68 | 85.1 |
| 1,500.00 | 65.92 | 1.93 | 14.46 | 45.39 | 20.27 | 13.48 | 6.06 | 1.63 | 1.69 | 85.4 |
| CATALYST A/L BLEND TOTAL L CONTENT = 3% ||||||||||| 
| 1,400.00 | 76.87 | 3.32 | 18.92 | 52.28 | 15.23 | 7.56 | 5.67 | 2.00 | 2.34 | 88.6 |
| 1,400.00 | 76.64 | 3.28 | 18.90 | 53.39 | 15.44 | 7.58 | 4.35 | 1.93 | 2.37 | 88.5 |
| 1,450.00 | 72.58 | 2.65 | 17.59 | 50.21 | 17.21 | 9.87 | 4.79 | 1.75 | 1.86 | 88.7 |
| 1,500.00 | 66.45 | 1.98 | 15.16 | 47.65 | 20.30 | 12.92 | 3.64 | 1.34 | 1.23 | 87.9 |
| 1,500.00 | 62.57 | 1.67 | 18.85 | 40.74 | 21.01 | 16.09 | 2.98 | 1.45 | 1.22 | 90.3 |
| CATALYST A/L BLEND TOTAL L CONTENT = 0.5% ||||||||||| 
| 1,400.00 | 79.23 | 3.82 | 17.81 | 54.92 | 13.99 | 6.45 | 6.51 | 2.02 | 3.04 | |
| 1,400.00 | 79.18 | 3.80 | 17.99 | 55.11 | 14.02 | 6.46 | 6.09 | 2.07 | 2.85 | |
| 1,450.00 | 71.06 | 2.46 | 14.87 | 51.76 | 17.84 | 10.77 | 4.43 | 1.70 | 1.85 | |
| 1,450.00 | 71.25 | 2.48 | 15.14 | 52.13 | 17.71 | 10.71 | 3.98 | 1.59 | 1.62 | |
| 1,500.00 | 62.80 | 1.69 | 12.95 | 46.19 | 20.96 | 15.91 | 3.65 | 1.42 | 1.12 | |
| 1,500.00 | 63.19 | 1.72 | 13.25 | 46.25 | 20.63 | 15.84 | 3.69 | 1.44 | 1.17 | |

EXAMPLE 5

The following example illustrates still another technique for the preparation of the novel catalyst of this invention as well as the catalytic testing thereof in order to show enhanced octane improvement. In these experiments, a different cracking catalyst (Catalyst B) was employed. The cracking catalyst is a rare earth-containing Y which was prepared in situ from a mixture of microspheres of calcined kaolin clay substantially in accordance with the teachings of U.S. Pat. No. 3,647,718, the entire disclosure of which is herein incorporated by reference. The analysis of the zeolite Y-containing catalyst and its physical properties are set forth in the following table.

| | |
|---|---|
| % $Al_2O_3$ | 52.50 |
| % $SiO_2$ | 42.40 |
| % $Na_2O$ | 0.46 |
| % $TiO_2$ | 2.18 |
| % $Fe_2O_3$ | 0.46 |
| % CaO | 0.02 |
| % MgO | 0.02 |
| % $K_2O$ | 0.01 |
| % ReO | 1.88 |
| Physical Properties: | |
| Zeolite Index = 16 | |
| Unit Cell Size = 24.74 A | |
| Total Surface Area = 265 m²/g | |
| $N_2$ Porosity (<100A) = 0.15 cc/g | |
| $N_2$ Porosity (<600A) = 0.20 cc/g | |
| Total $N_2$ Porosity = 0.29 cc/g | |

A sample of zeolite L-containing microspheres was prepared by spray drying zeolite L obtained from Union Carbide Corporation along with kaolin (ASP-600) and sodium silicate as a binder. Composition of the dryer feed was 30% zeolite L/20% sodium silicate/50% hydrous kaolin. A sample of the microspheres containing 30% zeolite L was ammonium exchanged to about 1% $K_2O$, using a solution of consisting of an aqueous 1:1 dilution of commercial 54% ammonium nitrate solution. The exchange procedure consisted of slurrying the catalyst in aqueous ammonium nitrate at a 1:2 ratio with stirring while adjusting the pH to 3.0–3.2, then heating to 180° F. for a period of about 15 minutes. Following this, the sample was filtered and washed with a volume of water at least equal to that of the catalyst. Typically, 10 or more exchanges by this technique are necessary to reduce the potassium content (as % $K_2O$) to the desired level of at least 1.0.

The microspheres containing zeolite L were then calcined for 3 hours at 1100° F. under "self steaming" conditions which comprise a covered silica calcining tray, 10% water added prior to calcination. Following this calcination step, the sample was ammonium exchanged twice in accordance with the procedure above described and then calcined for an additional 3 hours at 1100° F. Catalyst B and the L-containing microspheres were then blended at a 5% additive level of microspheres containing zeolite L and a 20% additive level of microspheres containing zeolite L and a 20% additive level of microspheres containing zeolite L.

It is important to note that the percentages of added zeolite L in Table 2 refer to the amount of "pure" zeolite L incorporated within the microspheres during spray drying. Some crystallinity is lost during subsequent ion exchange and stabilization procedures. Therefore, the amounts of zeolite L specified here are likely to be greater than the amount of zeolite L actually present, although still generally representative of a functional additive loading.

The results obtained compared to a control containing no additive are shown in the following table when utilizing the catalyst in FCC cracking. The test conditions used are also included in the following table.

TABLE 2

FCC PILOT UNIT YIELDS AND OPERATING CONDITIONS CATALYST B WITH L CONTAINING MICROSPHERES

| Catalyst | Catalyst B | | Catalyst B + 5% Additive | | Catalyst B + 20% Additive | |
|---|---|---|---|---|---|---|
| Zeolite L, Wt. % | 0 | | 1.5 | | 6.0 | |
|  | Act | Norm | Act | Norm | Act | Norm |
| Conversion (421° F. EP) | 69.74 | 70.00 | 70.01 | 70.00 | 71.57 | 70.00 |
| Activity | 2.30 | 2.33 | 2.33 | 2.33 | 2.52 | 2.33 |
| $H_2S$ | 0.26 | 0.26 | 0.23 | 0.23 | 0.24 | 0.23 |
| Hydrogen | 0.06 | 0.06 | 0.06 | 0.06 | 0.06 | 0.06 |
| Methane | 0.27 | 0.27 | 0.30 | 0.30 | 0.31 | 0.30 |
| Ethylene | 0.31 | 0.31 | 0.36 | 0.36 | 0.43 | 0.42 |
| Ethane | 0.19 | 0.19 | 0.22 | 0.22 | 0.23 | 0.22 |
| Propylene | 2.95 | 2.96 | 3.31 | 3.31 | 3.80 | 3.72 |
| Propane | 0.29 | 0.29 | 0.35 | 0.35 | 0.49 | 0.48 |
| I-Butane | 1.72 | 1.73 | 1.92 | 1.92 | 2.24 | 2.19 |
| Butylenes | 2.13 | 2.14 | 2.36 | 2.36 | 2.54 | 2.48 |
| N-Butane | 0.22 | 0.22 | 0.26 | 0.26 | 0.35 | 0.34 |
| Trans-Butene-2 | 0.90 | 0.90 | 0.99 | 0.99 | 1.09 | 1.07 |
| Cis-Butene-2 | 0.64 | 0.64 | 0.70 | 0.70 | 0.76 | 0.74 |
| 1,3-Butadiene | 0.02 | 0.02 | 0.02 | 0.02 | 0.02 | 0.02 |
| $iC_4/C_4$ Olefins |  | 0.81 |  | 0.81 |  | 0.88 |
| $C_2$-Minus | 1.09 | 1.09 | 1.17 | 1.17 | 1.27 | 1.24 |
| LPG | 8.85 | 8.88 | 9.90 | 9.90 | 11.28 | 11.03 |
| Gasoline (421 EP) | 57.05 | 57.26 | 56.14 | 56.13 | 56.45 | 55.21 |
| LCO (602 EP) | 19.42 | 19.25 | 19.32 | 19.33 | 17.87 | 18.86 |
| Bottoms (602+) | 10.84 | 10.75 | 10.67 | 10.67 | 10.56 | 11.14 |
| Coke | 2.75 | 2.76 | 2.79 | 2.79 | 2.57 | 2.51 |
| C/O | 14.64 |  | 14.24 |  | 15.65 |  |
| Reactor T, °F. | 970 |  | 972 |  | 971 |  |
| Regen T, °F. | 1261 |  | 1263 |  | 1253 |  |
| Delta Carbon | 0.18 |  | 0.19 |  | 0.16 |  |
| $C_5$-421° F. RON | 89.2 |  | 89.2 |  | 90.3 |  |
| $C_5$-421° F. MON | 78.4 |  | 78.4 |  | 78.8 |  |

As can be seen from the above table, when utilizing a 20% additive of zeolite L-containing microspheres equivalent to 6% by weight of pure zeolite L, the research octane number of the resulting gasoline was enhanced by +1.1 and the motor octane number was enhanced by +0.4 at a gasoline yield loss of only 2.05%.

When using a catalyst blend containing only 1.5% zeolite L, no substantial increase in octane number was obtained over the standard.

EXAMPLE 6

Experimental work carried out subsequent to the filing date of U. S. Ser. No. 216,682 suggests that the effect of zeolite L can be made more substantial than is illustrated by Example 5. (In Ser. No. 216,682, this data appears as Example 3). The data of Table 2 shows no dependence on L content with regard to Motor Octane Number (MON) and a much lower sensitivity of Delta Research Octane Number (RON) with regard to L concetration. Subsequent experimentation showed a stronger sensitivity of MON and RON to zeolite L content. The data of Table 2 is consistent with the overall trends for Delta gasoline and Delta coke as verified by subsequent experimentation. The data in Example 4 (Example 2 in patent application) is substantially accurate. While not actually knowing it, it seems reasonable that the octane measurement reported in Table 2 were in error. Three sets of data are presented A) The original data which appears in Example 5.
B) One set of runs done in 1989 (4 runs ).
C) One set of runs done in 1990 (7 runs).

The reason the data is presented as three sets is to eliminate any bias in unit operations, simulated distillations and octane measurements which may have taken place from year to year.

All runs were adjusted to a constant 70% by using accepted correlations. The adjusted wt. % yields for the runs in Table 2 are slightly different than originally reported because the correlations were not exactly the same as previously used.

The procedure of Example 5 was repeated with blends containing various levels of L and these were compared with the same Y catalyst without L.

A) Set A

The original experiments in Table 2 recalculated are shown below in Table 3.

B) The 1989 Runs

The procedure of Example 5 was repeated. Duplicate runs at zeolite L levels of 1.2 wt % and 3.0 wt. together with a 14 run average of "Catalyst B" of Example 5 (no zeolite L) are presented in Tables 4-6.

C) The 1990 Runs

The procedure of Example 5 was repeated. Three runs at zeolite L levels of 1.2 wt % and 5.0 wt % as well as an average of multiple runs of "Catalyst B" (no L) are presented in Tables 7, 8 and 9.

TABLE 3

| Catalyst | B | B | B |
|---|---|---|---|
| Added Zeolite | 0% L | 1.5% L | 6% L |
| Actual Yields, wt. % |  |  |  |
| Conversion | 69.74 | 70.01 | 71.57 |
| Activity | 2.3 | 2.33 | 2.52 |
| Hydrogen sulfide | 0.26 | 0.23 | 0.24 |
| Hydrogen | 0.06 | 0.06 | 0.06 |
| Methane | 0.27 | 0.3 | 0.31 |
| Ethylene | 0.31 | 0.36 | 0.43 |
| Ethane | 0.19 | 0.22 | 0.23 |
| Propylene | 2.95 | 3.31 | 3.8 |
| Propane | 0.29 | 0.35 | 0.49 |
| Isobutane | 1.72 | 1.92 | 2.24 |
| Butylenes | 2.13 | 2.36 | 2.54 |
| Normal Butane | 0.22 | 0.26 | 0.35 |
| Trans 2-Butene | 0.9 | 0.99 | 1.09 |
| Cis 2-Butene | 0.64 | 0.7 | 0.76 |
| 1-3 Butadiene | 0.02 | 0.02 | 0.02 |
| Dry Gas | 1.09 | 1.17 | 1.27 |
| LPG | 8.85 | 9.9 | 11.28 |
| C4- | 9.94 | 11.07 | 12.55 |
| C5/421° F. | 57.05 | 56.14 | 56.45 |
| 421/602° F. | 19.42 | 19.32 | 17.87 |
| 602° F.+ | 10.84 | 10.67 | 10.56 |
| Coke | 2.75 | 2.79 | 2.57 |
| Octane, RON | 89.2 | 89.2 | 90.3 |
| Octane, MON | 78.4 | 78.4 | 78.8 |
| Norm. Yields, wt. % |  |  |  |
| Conversion | 70.00 | 70.00 | 70.00 |
| Activity | 2.33 | 2.33 | 2.33 |
| Dry Gas | 1.10 | 1.17 | 1.22 |
| LPG | 8.90 | 9.90 | 11.01 |
| C4- | 10.00 | 11.08 | 12.23 |
| C5/421° F. | 57.23 | 56.13 | 55.33 |
| 421/602° F. | 19.27 | 19.33 | 18.75 |
| 602° F.+ | 10.73 | 10.67 | 11.25 |
| Coke | 2.77 | 2.79 | 2.45 |
| Octane, RON | 89.3 | 89.2 | 90.0 |
| Octane, MON | 78.5 | 78.4 | 78.5 |
| delta gasoline | 0.00 | −1.1 | −1.9 |
| delta coke | 0.00 | 0.0 | 0.3 |
| delta RON | 0.00 | −0.1 | 0.8 |

TABLE 3-continued

| Catalyst | B | B | B |
|---|---|---|---|
| delta MON | 0.00 | −0. | 0.0 |

TABLE 4

| Catalyst | B | B |
|---|---|---|
| Added Zeolite | (0% L) | (1.2% L) |
| Actual Yields, wt. % on Prod. | | |
| Conversion | 71.46 | 72.65 |
| Activity | 2.52 | 2.65 |
| Hydrogen sulfide | 0.30 | 0.28 |
| Hydrogen | 0.04 | 0.03 |
| Methane | 0.30 | 0.29 |
| Ethylene | 0.39 | 0.44 |
| Ethane | 0.26 | 0.27 |
| Propylene | 3.74 | 3.91 |
| Propane | 0.37 | 0.43 |
| Isobutane | 2.21 | 2.48 |
| Butylenes | 2.79 | 2.85 |
| Normal Butane | 0.30 | 0.37 |
| Trans 2-Butene | 1.22 | 1.32 |
| Cis 2-Butene | 0.89 | 0.97 |
| 1-3 Butadiene | 0.01 | 0.01 |
| Dry Gas | 1.29 | 1.31 |
| LPG | 11.54 | 12.35 |
| C4− | 12.83 | 13.66 |
| C5/421° F. | 56.41 | 56.48 |
| 421/602° F. | 18.68 | 18.12 |
| 602° F.+ | 9.85 | 9.25 |
| Coke | 2.22 | 2.50 |
| Octane, RON | 88.9 | 89.3 |
| Octane, MON | 78.7 | 79.2 |
| Norm. Yields. wt. % | | |
| Conversion | 70.00 | 70.00 |
| Activity | 2.33 | 2.33 |
| Dry Gas | 1.24 | 1.23 |
| LPG | 11.27 | 11.88 |
| C4− | 12.51 | 13.11 |
| C5/421° F. | 55.39 | 54.61 |
| 421/602° F. | 19.51 | 19.59 |
| 602° F.+ | 10.49 | 10.41 |
| Coke | 2.10 | 2.28 |
| Octane, RON | 88.6 | 88.8 |
| Octane, MON | 78.4 | 78.6 |
| delta gasoline | 0.00 | −0.78 |
| delta coke | 0.00 | 0.18 |
| delta RON | 0.00 | 0.2 |
| delta MON | 0.00 | 0.2 |

TABLE 5

| Catalyst | B |
|---|---|
| Added Zeolite | Zeolite-L (1.2% L) |
| Actual Yields, wt. % on Prod. | |
| Conversion | 73.48 |
| Activity | 2.77 |
| Hydrogen sulfide | 0.27 |
| Hydrogen | 0.04 |
| Methane | 0.32 |
| Ethylene | 0.44 |
| Ethane | 0.28 |
| Propylene | 4.07 |
| Propane | 0.42 |
| Isobutane | 2.51 |
| Butylenes | 2.93 |
| Normal Butane | 0.36 |
| Trans 2-Butene | 1.34 |
| Cis 2-Butene | 0.98 |
| 1-3 Butadiene | 0.01 |
| Dry Gas | 1.36 |
| LPG | 12.63 |
| C4− | 13.99 |
| C5/421° F. | 56.91 |
| 421/602° F. | 17.67 |
| 602° F.+ | 8.85 |
| Coke | 2.58 |
| Octane, RON | |

TABLE 5-continued

| Catalyst | B |
|---|---|
| Octane, MON | |
| Norm. Yields. wt. % | |
| Conversion | 70.00 |
| Activity | 2.33 |
| Dry Gas | 1.25 |
| LPG | 11.99 |
| C4− | 13.24 |
| C5/421° F. | 54.47 |
| 421/602° F. | 19.62 |
| 602° F.+ | 10.38 |
| Coke | 2.29 |
| Octane, RON | |
| Octane, MON | |
| delta gasoline | −0.91 |
| delta coke | 0.19 |
| delta RON | |
| delta MON | |

TABLE 6

| Catalyst | B | B |
|---|---|---|
| | Zeolite-L (3% L) | Zeolite-L (3% L) |
| Actual Yields, wt. % on Prod. | | |
| Conversion | 71.10 | 71.85 |
| Activity | 2.46 | 2.55 |
| Hydrogen sulfide | 0.27 | 0.27 |
| Hydrogen | 0.04 | 0.04 |
| Methane | 0.29 | 0.29 |
| Ethylene | 0.42 | 0.42 |
| Ethane | 0.26 | 0.26 |
| Propylene | 3.68 | 3.78 |
| Propane | 0.42 | 0.41 |
| Isobutane | 2.27 | 2.29 |
| Butylenes | 2.91 | 2.84 |
| Normal Butane | 0.36 | 0.34 |
| Trans 2-Butene | 1.31 | 1.26 |
| Cis 2-Butene | 0.98 | 0.93 |
| 1-3 Butadiene | 0.02 | 0.01 |
| Dry Gas | 1.28 | 1.27 |
| LPG | 11.95 | 11.86 |
| C4− | 13.22 | 13.14 |
| C5/421° F. | 55.67 | 56.36 |
| 421/602° F. | 19.41 | 18.96 |
| 602° F.+ | 9.49 | 9.20 |
| Coke | 2.21 | 2.35 |
| Octane, RON | 89.1 | 89.5 |
| Octane, MON | 79.2 | 79.2 |
| Norm. Yields, wt. % | | |
| Conversion | 70.00 | 70.00 |
| Activity | 2.33 | 2.33 |
| Dry Gas | 1.25 | 1.22 |
| LPG | 11.76 | 11.54 |
| C4 | 13.00 | 12.76 |
| C5/421° F. | 54.87 | 55.04 |
| 421/602° F. | 20.03 | 19.99 |
| 602° F.+ | 9.97 | 10.01 |
| Coke | 2.12 | 2.20 |
| Octane, RON | 88.9 | 89.2 |
| Octane, MON | 79.0 | 78.8 |
| delta gasoline | −0.51 | −0.35 |
| delta coke | 0.02 | 0.11 |
| delta RON | 0.3 | 0.6 |
| delta MON | 0.6 | 0.5 |

TABLE 7

| Catalyst | B | B |
|---|---|---|
| Added Zeolite | (0% L) | (1.2% L) |
| Actual Yields, wt. % on Prod. | Avg. | |
| Conversion | 73.85 | 72.07 |
| Activity | 2.84 | 2.58 |
| Hydrogen sulfide | 0.25 | 0.30 |
| Hydrogen | 0.05 | 0.04 |
| Methane | 0.38 | 0.37 |
| Ethylene | 0.43 | 0.46 |
| Ethane | 0.25 | 0.26 |

TABLE 7-continued

| Catalyst | B | B |
|---|---|---|
| Propylene | 3.85 | 3.86 |
| Propane | 0.41 | 0.43 |
| Isobutane | 2.30 | 1.98 |
| Butylenes | 2.23 | 2.70 |
| Normal Butane | 0.30 | 0.28 |
| Trans 2-Butene | 1.04 | 1.10 |
| Cis 2-Butene | 0.83 | 0.86 |
| 1-3 Butadiene | 0.01 | 0.02 |
| Dry Gas | 1.36 | 1.42 |
| LPG | 10.97 | 11.23 |
| C4- | 12.34 | 12.65 |
| C5/421° F. | 59.11 | 57.39 |
| 421/602° F. | 17.46 | 17.69 |
| 602° F.+ | 8.69 | 10.24 |
| Coke | 2.40 | 2.02 |
| Octane, RON | 88.7 | 89.7 |
| Octane, MON | 79.2 | 79.7 |
| Norm. Yields, wt. % | | |
| Conversion | 70.00 | 70.00 |
| Activity | 2.33 | 2.33 |
| Dry Gas | 1.24 | 1.36 |
| LPG | 10.23 | 10.87 |
| C4 | 11.47 | 12.23 |
| C5/421° F. | 56.46 | 55.91 |
| 421/602° F. | 19.62 | 18.85 |
| 602° F.+ | 10.38 | 11.15 |
| Coke | 2.06 | 1.86 |
| Octane, RON | 88.0 | 89.3 |
| Octane, MON | 78.4 | 79.3 |
| delta gasoline | 0.00 | −0.55 |
| delta coke | 0.00 | −0.20 |
| delta RON | 0.00 | 1.3 |
| delta MON | 0.00 | 0.9 |

TABLE 8

| Catalyst | B | B | B |
|---|---|---|---|
| | (1.2% L) | (5% L) | (5% L) |
| Actual Yields, wt. % on Prod. | | | |
| Conversion | 72.96 | 73.04 | 71.92 |
| Activity | 2.70 | 2.71 | 2.56 |
| Hydrogen sulfide | 0.27 | 0.27 | 0.24 |
| Hydrogen | 0.04 | 0.05 | 0.04 |
| Methane | 0.36 | 0.39 | 0.34 |
| Ethylene | 0.45 | 0.57 | 0.49 |
| Ethane | 0.25 | 0.23 | 0.24 |
| Propylene | 3.95 | 4.16 | 3.94 |
| Propane | 0.43 | 0.83 | 0.49 |
| Isobutane | 2.13 | 2.77 | 2.06 |
| Butylenes | 2.65 | 2.60 | 2.70 |
| Normal Butane | 0.30 | 0.51 | 0.34 |
| Trans 2-Butene | 1.12 | 1.11 | 1.11 |
| Cis 2-Butene | 0.88 | 0.88 | 0.89 |
| 1-3 Butadiene | 0.02 | 0.02 | 0.02 |
| Dry Gas | 1.37 | 1.51 | 1.36 |
| LPG | 11.47 | 12.88 | 11.54 |
| C4- | 12.85 | 14.40 | 12.90 |
| C5/421° F. | 58.18 | 55.62 | 56.82 |
| 421/602° F. | 17.68 | 17.35 | 17.86 |
| 602° F.+ | 9.36 | 9.60 | 10.22 |
| Coke | 1.94 | 3.03 | 2.21 |
| Octane, RON | 89.3 | | 90.6 |
| Octane, MON | 79.0 | | 80.1 |
| Norm. Yields, wt. % | | | |
| Conversion | 70.00 | 70.00 | 70.00 |
| Activity | 2.33 | 2.33 | 2.33 |
| Dry Gas | 1.28 | 1.42 | 1.30 |
| LPG | 10.94 | 12.33 | 11.21 |
| C4- | 12.22 | 13.75 | 12.51 |
| C5/421° F. | 56.09 | 53.47 | 55.44 |
| 421/602° F. | 19.34 | 19.06 | 18.94 |
| 602° F.+ | 10.66 | 10.94 | 11.06 |
| Coke | 1.69 | 2.78 | 2.05 |
| Octane, RON | 88.8 | | 90.3 |
| Octane, MON | 78.4 | | 79.7 |
| delta gasoline | −0.38 | −2.99 | −1.02 |
| delta coke | −0.37 | 0.71 | −0.01 |
| delta RON | 0.8 | | 2.3 |

TABLE 8-continued

| Catalyst | B | B | B |
|---|---|---|---|
| delta MON | 0.00 | | 1.3 |

TABLE 9

| Catalyst | B | B | B |
|---|---|---|---|
| | (5% L) | (1.2% L) | (5% L) |
| Actual Yields, wt. % on Prod. | | | |
| Conversion | 72.70 | 72.91 | 73.73 |
| Activity | 2.66 | 2.69 | 2.80 |
| Hydrogen sulfide | 0.24 | 0.25 | 0.27 |
| Hydrogen | 0.05 | 0.04 | 0.04 |
| Methane | 0.34 | 0.36 | 0.36 |
| Ethylene | 0.49 | 0.46 | 0.47 |
| Ethane | 0.23 | 0.25 | 0.24 |
| Propylene | 3.97 | 3.94 | 4.21 |
| Propane | 0.52 | 0.38 | 0.42 |
| Isobutane | 2.19 | 2.01 | 2.22 |
| Butylenes | 2.46 | 2.61 | 2.78 |
| Normal Butane | 0.34 | 0.27 | 0.31 |
| Trans 2-Butene | 1.04 | 1.11 | 1.19 |
| Cis 2-Butene | 0.82 | 0.87 | 0.94 |
| 1-3 Butadiene | 0.02 | 0.02 | 0.02 |
| Dry Gas | 1.35 | 1.36 | 1.37 |
| LPG | 11.37 | 11.20 | 12.09 |
| C4- | 12.73 | 12.56 | 13.46 |
| C5/421° F. | 57.40 | 58.30 | 58.10 |
| 421/602° F. | 17.27 | 17.45 | 17.00 |
| 602° F.+ | 10.03 | 9.64 | 9.28 |
| Coke | 2.57 | 2.05 | 2.16 |
| Octane, RON | 90.6 | 89.1 | 90.0 |
| Octane, MON | 80.4 | 78.9 | 80.1 |
| Norm. Yields, wt. % | | | |
| Conversion | 70.00 | 70.00 | 70.00 |
| Activity | 2.33 | 2.33 | 2.33 |
| Dry Gas | 1.27 | 1.27 | 1.26 |
| LPG | 10.89 | 10.68 | 11.39 |
| C4 | 12.16 | 11.94 | 12.65 |
| C5/421° F. | 55.49 | 56.25 | 55.51 |
| 421/602° F. | 18.79 | 19.05 | 19.09 |
| 602° F.+ | 11.21 | 10.91 | 10.91 |
| Coke | 2.35 | 1.81 | 1.84 |
| Octane, RON | 90.1 | 88.6 | 89.4 |
| Octane, MON | 79.8 | 78.3 | 79.3 |
| delta gasoline | −0.98 | −0.22 | −0.95 |
| delta coke | 0.29 | −0.25 | −0.22 |
| delta RON | 2.1 | 0.6 | 1.4 |
| delta MON | 1.4 | −0.1 | 0.9 |

In the 1990 runs, the zeolite L was prepared in-situ according to the procedure of Example 4.

As can be seen from the above, the octane response data data of Table 3 (corresponding to Table 2 in the parent application) is less than the octane response data in Tables 4-9. As a practical matter, the data in Tables 4-9 show that a blend containing about 1% zeolite L is effective for increasing octane whereas the data in Table 3 does not.

EXAMPLE 7

The MAT testing of example 4 was repeated with the exception that in-situ prepared zeolite L was substituted for the zeolite L crystals.

Six blends were made with zeolite Y in the manner of Example 4 so as to result in catalysts which has zeolite L contents of 0, 5, 10, 15, 20 and 25 wt. % based of total catalyst.

The coke selectivities (coke/activity) obtained from said MAT testing is shown in FIG. 1. As can be seen up to about 10% zeolite L, the coke selectivity increase is relatively small; from about 10% zeolite L up to 20% zeolite L, the coke increases and at zeolite L levels of 20-25%, a plateau in coke selectivity is reached. Therefore, about 10% appears to be the highest level of zeolite L which will produce acceptable results.

EXAMPLE 8

This example is a comparison in that instead of using zeolite L, as was utilized the previous examples, 1.2 wt. % of ZSM-5 was utilized. Test conditions were the same as in Example 5.

The results obtained are shown in Table 10, wherein col. 1 is a 14-run average of Catalyst B and col. 2 is a 3-run average of a mixture of Catalyst B and 1.2 wt. % ZSM-5.

TABLE 10

| Catalyst | B | B |
|---|---|---|
| ZSM-5 Conc. Wt. % | 0 | 1.2 |
| Conversion | 71.46 | 71.93 |
| Activity | 2.52 | 2.56 |
| Hydrogen Sulfide | 0.30 | 0.28 |
| Hydrogen | 0.04 | 0.04 |
| Methane | 0.30 | 0.29 |
| Ethylene | 0.39 | 0.50 |
| Ethane | 0.26 | 0.27 |
| Propylene | 3.74 | 5.62 |
| Propane | 0.37 | 0.46 |
| Isobutane | 2.21 | 2.56 |
| Butylenes | 2.79 | 3.32 |
| Normal butane | 0.30 | 0.32 |
| Trans 2-butene | 1.22 | 1.45 |
| CIS 2-butene | 0.89 | 1.02 |
| 1-3 butadiene | 0.01 | 0.01 |
| Dry gas | 1.29 | 1.39 |
| LPG | 11.54 | 14.76 |
| C4 | 12.83 | 16.14 |
| C5/421° F. | 56.41 | 53.48 |
| 421/602° F. | 18.68 | 18.70 |
| 602° F.+ | 9.85 | 9.37 |
| Coke | 2.22 | 2.31 |
| Octane, RON | 88.9 | 90.1 |
| Octane, MON | 78.7 | 79.2 |
| Norm. Yields, Wt. % | | |
| Conversion | 70.00 | 70.00 |
| Activity | 2.33 | 2.33 |
| Dry gas | 1.24 | 1.33 |
| LPG | 11.27 | 14.42 |
| C4- | 12.51 | 15.75 |
| C5/421° F. | 55.39 | 52.10 |
| 421/602° F. | 19.51 | 19.78 |
| 602° F.+ | 10.49 | 10.22 |
| Coke | 2.10 | 2.16 |

TABLE 10-continued

| Catalyst | B | B |
|---|---|---|
| Octane, RON | 88.6 | 89.8 |
| Octane, MON | 78.4 | 78.8 |
| Delta gasoline | | −3.29 |
| Delta coke | | 0.06 |
| Delta RON | | 1.2 |
| Delta MON | | 0.4 |

COMPARISON OF ZEOLITE L WITH EXAMPLE 8

The use of zeolite L at 3 and 5 wt. % was compared to 1.2% ZMS-5. The comparison is shown in Table 11. The zeolite L results were average values of several runs.

TABLE 11

| Additive | ZSM-5 | L | L |
|---|---|---|---|
| % zeolite | 1.2 | 3 | 5 |
| Gasoline loss, Wt. % | 3.29 | 0.43 | 0.98 |
| Delta RON | 1.2 | 0.4 | 1.9 |
| Delta MON | 0.4 | 0.5 | 1.2 |
| Delta RON/gasoline loss | 0.36 | .93 | 1.94 |
| Delta MON/gasoline loss | 0.12 | 1.16 | 1.22 |

All additives run with Catalyst B. Delta values calculated relative to Catalyst B. All delta values and gasoline losses are averages for runs at that level with octane determinations.

What is claimed is:

1. In a process for the catalytic cracking of gas oils to obtain gasoline wherein said gas oil is contacted under elevated temperatures with crystalline aluminosilicate zeolites and an inorganic matrix wherein the matrix is associated with either or both zeolites or present as separate discrete particles, the improvement which comprises utilizing a mixture of zeolite L and zeolite Y wherein the zeolite L is present in an amount ranging from 1-10 wt. % based on total catalyst composition.

2. The process of claim 1 wherein catalytic cracking is carried out in a fluid catalytic cracking unit, or thermotor catalytic cracking.

3. The process of claim 1 wherein said zeolite Y is hydrothermally stablilized zeolite Y.

4. The process of claim 1 wherein said zeolite L is ultrastable L.

* * * * *